US012089061B2

(12) United States Patent
Wang et al.

(10) Patent No.: US 12,089,061 B2
(45) Date of Patent: Sep. 10, 2024

(54) ESTABLISHING PEER-TO-PEER LINKS FOR PEER-TO-PEER COMMUNICATION BETWEEN USER EQUIPMENT

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 547 days.

(21) Appl. No.: 17/432,277

(22) PCT Filed: Mar. 2, 2020

(86) PCT No.: PCT/US2020/020700
§ 371 (c)(1),
(2) Date: Aug. 19, 2021

(87) PCT Pub. No.: WO2020/180816
PCT Pub. Date: Sep. 10, 2020

(65) Prior Publication Data
US 2022/0201503 A1 Jun. 23, 2022

Related U.S. Application Data

(60) Provisional application No. 62/814,979, filed on Mar. 7, 2019.

(51) Int. Cl.
*H04W 16/28* (2009.01)
*H04B 7/08* (2006.01)
*H04W 76/14* (2018.01)

(52) U.S. Cl.
CPC ............ *H04W 16/28* (2013.01); *H04B 7/088* (2013.01); *H04W 76/14* (2018.02)

(58) Field of Classification Search
CPC ................ H04B 7/0617; H04B 7/0695; H04B 7/06966; H04B 7/088; H04B 7/06952;
(Continued)

(56) References Cited

U.S. PATENT DOCUMENTS

2014/0206406 A1 7/2014 Cordeiro et al.
2016/0007355 A1 1/2016 Cordeiro et al.
(Continued)

FOREIGN PATENT DOCUMENTS

CN 105009474 A 10/2015
CN 107078768 A 8/2017
(Continued)

OTHER PUBLICATIONS

U.S. Appl. No. 62/737,257, Drawings-only_black_and_white_line_drawings,Sep. 27, 2018 (Year: 2018).*
(Continued)

*Primary Examiner* — Chi H Pham
*Assistant Examiner* — Ji-Hae Yea
(74) *Attorney, Agent, or Firm* — PATENT PORTFOLIO BUILDERS PLLC

(57) ABSTRACT

Techniques and apparatuses are described for enabling a base station to enable peer-to-peer communication among multiple user equipment (UE) over a mmWave link. The techniques described herein overcome challenges that the multiple UEs might otherwise face in trying to establish peer-to-peer links on their own. By relying on the base station to grant air interface resources for the UE to perform peer-to-peer communications with the UE, the UE can communicate directly with the other UE, independent of links that the UE or the other UE maintains with the base station. Furthermore, reliance on the base station may help the UE and the other UE mitigate interference from other nearby mmWave links that are separate from the peer-to-
(Continued)

peer wave link. In addition, by relying on the base station to specify the beam sweeping pattern, beam acquisition by the UE and the other UE may be improved.

17 Claims, 5 Drawing Sheets

(58) Field of Classification Search
CPC ............ H04B 7/06954; H04B 7/06956; H04B 7/06958; H04B 7/0696; H04B 7/06962; H04B 7/06964; H04B 7/06968; H04W 16/28; H04W 76/14
See application file for complete search history.

(56) References Cited

U.S. PATENT DOCUMENTS

| | | |
|---|---|---|
| 2016/0021548 A1 | 1/2016 | Raghavan et al. |
| 2016/0135090 A1 | 5/2016 | Krishnamoorthy et al. |
| 2018/0092116 A1 | 3/2018 | Pietraski et al. |
| 2018/0103492 A1 | 4/2018 | Akkarakaran et al. |
| 2018/0343605 A1 | 11/2018 | Wu et al. |
| 2019/0043369 A1 | 2/2019 | Miller et al. |
| 2020/0036422 A1* | 1/2020 | Li .................... H04W 74/0808 |
| 2022/0007403 A1* | 1/2022 | Li ........................ H04W 72/20 |

FOREIGN PATENT DOCUMENTS

| | | |
|---|---|---|
| WO | 2014124164 A1 | 8/2014 |
| WO | WO-2019160973 A1 * | 8/2019 |
| WO | 2020180816 | 9/2020 |

OTHER PUBLICATIONS

U.S. Appl. No. 62/737,257, Specification,Sep. 27, 2018 (Year: 2018).*
U.S. Appl. No. 62/754,326, Drawings-only_black_and_white_line_drawings,Nov. 1, 2018 (Year: 2018).*
U.S. Appl. No. 62/754,326, Specification,Nov. 1, 2018 (Year: 2018).*
U.S. Appl. No. 62/711,315, Specification,Jul. 27, 2018 (Year: 2018).*
Chinese Notification of First Office Action dated Nov. 17, 2023, for corresponding/related Chinese Application No. 202080013053.0, including English translation (19 pages).
Panno, et al., "A New Centralized Access Control Scheme for D2D-Enabled mmWave Networks", Jun. 17, 2019, 20 pages.
Qiao, et al., "Enabling Device-to-Device Communications in Millimeter-Wave 5G Cellular Networks", IEEE Communications Magazine, Jan. 2015, 7 pages.
"International Preliminary Report on Patentability", Application No. PCT/US2020/020700, Aug. 25, 2021, 10 pages.
"Foreign Office Action", IN Application No. 202147034889, Mar. 29, 2022, 5 pages.
"International Search Report and Written Opinion", PCT Application No. PCT/US2020/020700, May 8, 2020, 15 pages.
"Written Opinion of the IPEA", PCT Application No. PCT/US2020/020700, Sep. 23, 2020, 7 pages.
Tehrani, et al., "Device-to-Device Communication in 5G Cellular Networks: Challenges, Solutions, and Future Directions", May 2014, 7 pages.
EP Office Action dated Mar. 1, 2024, for corresponding/related EP Application No. 20714805.7.

* cited by examiner

ESTABLISHING PEER-TO-PEER LINKS FOR PEER-TO-PEER COMMUNICATION BETWEEN USER EQUIPMENT

RELATED APPLICATION(S)

This application is a national stage entry of International Application No. PCT/US2020/020700, filed Mar. 2, 2020, which in turn claims priority to U.S. Provisional Application No. 62/814,979, filed Mar. 7, 2019, the disclosures of which are incorporated herein by reference in their entireties.

BACKGROUND

Generally, a provider of a wireless network manages wireless communications over the wireless network. For example, a base station manages a wireless connection with user equipment (UE) that is connected to the wireless network. The base station determines configurations for the wireless connection, such as bandwidth and timing for the wireless connection.

The link quality between the UE and the base station can degrade due to several factors, such as loss in signal strength, interfering signals, and so forth. A number of solutions have been developed to improve signal quality issues occurring in certain wireless communication systems. However, with recent advancements in wireless communication systems, such as increased data transmission speeds associated with Fifth Generation New Radio (5G NR), at least some of those previous solutions have become less efficient.

SUMMARY

This document describes techniques and apparatuses for enabling a UE to establish direct wireless links for peer-to-peer (P2P) communication with other UEs in the millimeter wave (mmWave) frequency band. These techniques overcome degraded quality of service that might arise with reliance on a base station link. The UE that performs the described techniques can communicate with other UE, via mmWave links established by the UE itself. The UE relies on the base station to allocate air interface resources for the mmWave link and to aid in identifying the other UE and in establishing the mmWave link. After establishment, the UE may communicate over the mmWave link.

Aspects described below include a method performed by a first UE to establish a peer-to-peer mmWave link with a second UE. The first UE receives, from a base station of a wireless network, an indication of a grant of air interface resources for the first UE to communicate on the peer-to-peer mmWave link with the second UE. The first UE also receives, from the base station, a beam-sweeping procedure for selecting a beam for establishing the peer-to-peer mmWave link with the second UE. The first UE executes the beam-sweeping procedure to select the beam for establishing the peer-to-peer mmWave link with the second UE and communicates with the second UE using the beam selected in response to executing the beam-sweeping procedure.

Aspects described below also include a method performed by a base station to establish a peer-to-peer mmWave link between a first UE and a second UE. The base station determines air interface resources for the first UE and the second UE to communicate using the peer-to-peer mmWave link. The base station also determines a beam-forming procedure for establishing the peer-to-peer mmWave link. The base station then transmits, to the first UE or the second UE, an indication of a grant of the air interface resources and an indication of the beam-forming procedure, the air interface resources and the beam-forming procedure by which communication is directed to be performed between the first and the second UE through the peer-to-peer mmWave link.

Aspects described below also include a first UE apparatus having a radio frequency transceiver and a processor and memory system coupled to the transceiver. The memory system comprises instructions that are executable to establish a peer-to-peer mmWave link with a second UE. The first UE apparatus is configured to receive, from a base station of a wireless network, an indication of a grant of air interface resources for the first UE to communicate on the peer-to-peer mmWave link with the second UE. The first UE apparatus is also configured to receive, from the base station, a beam-sweeping procedure for selecting a beam for establishing the peer-to-peer mmWave link with the second UE. The first UE apparatus is further configured to execute the beam-sweeping procedure to select the beam for establishing the peer-to-peer mmWave link with the second UE and communicates with the second UE using the beam selected in response to executing the beam-sweeping procedure.

Aspects described below also include a base station apparatus having a radio frequency transceiver and a processor and memory system coupled to the transceiver. The memory system comprises instructions that are executable to establish a peer-to-peer mmWave link between a first UE and a second UE. The base station apparatus is configured to determine air interface resources for the first UE and the second UE to communicate using the peer-to-peer mmWave link. The base station apparatus is also configured to determine a beam-forming procedure for establishing the peer-to-peer mmWave link. The base station is configured to then transmit, to the first UE or the second UE, an indication of a grant of the air interface resources and an indication of the beam-forming procedure, the air interface resources and the beam-forming procedure by which communication is directed to be performed between the first and the second UE through the peer-to-peer mmWave link.

A unified air interface, which utilizes licensed, unlicensed, and shared license radio spectrum, in multiple frequency bands, helps enable the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband. mmWave frequency bands may be within the range of 30 GHz to 300 GHz, or mmWave frequency bands may be within the range of 24.25 GHz to 52.6 GHz. As used throughout this document, "millimeter wave", "mmWave", "mmW" and "MMW" wireless communication links or "mmWave links", for short, refers to communication signals that exist in these mmWave frequency bands.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of establishing peer-to-peer mmWave links are described below. The use of the same reference numbers in different instances in the description and the figures indicate similar elements.

DETAILED DESCRIPTION

Overview

Figure 1:
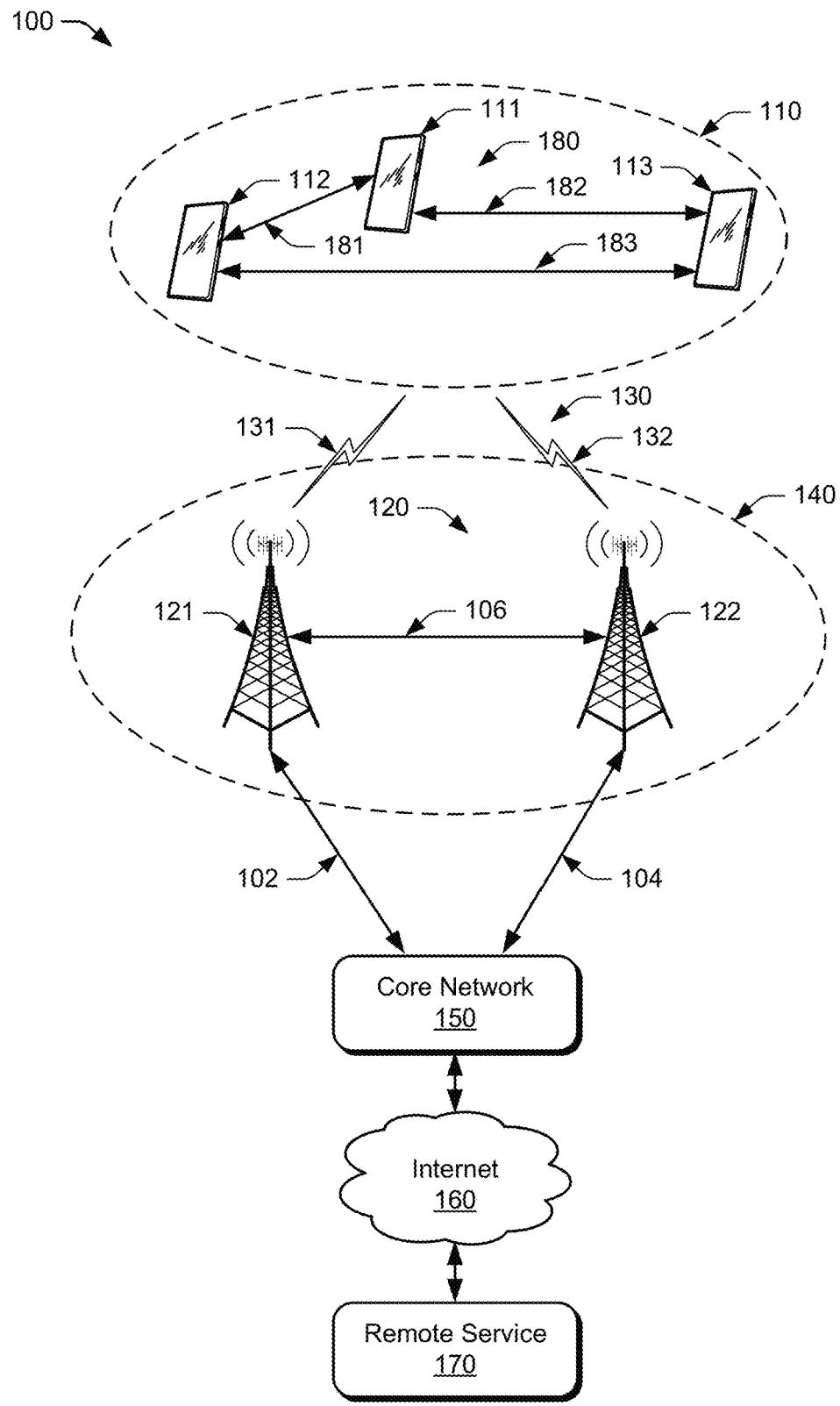
FIG. 1 illustrates an example operating environment in which UEs can establish peer-to-peer mmWave links with other UEs.

In conventional wireless communication systems, a radio frequency (RF) signal quality (link quality) between user equipment (UE) and a base station can degrade due to a number of factors, including signal interference and distance between the UE and the base station. The signal degradation may result in slower and less-efficient data transmission. Techniques have been developed to improve the link quality between the base station and the UE. However, such improvements in the link quality to this point have been insufficient in preventing some slow or failed data transmissions.

In accordance with the described techniques, an example base station coordinates UE beam sweeping procedures that, when performed, enable multiple UEs to establish peer-to-peer (also referred to as "UE-to-UE") mmWave links. Peer-to-peer mmWave links enable UEs to increase link quality, for instance, to reduce slow or failed data transmissions. Rather than use a link with a base station to communicate with a nearby UE, the two UEs can work in coordination with the base station to establish peer-to-peer mmWave links that may have a higher link quality. The UEs communicate with the base station to request authorization and obtain an allocation of air interface resources (e.g., a resource grant) to establish communications on a peer-to-peer mmWave link.

In one example, multiple UEs (e.g., in a low radio-coverage area) can form peer-to-peer mmWave links to communicate among each of the UEs despite being far removed from a base station in the area. The peer-to-peer mmWave links may enable the UEs to communicate using a higher link quality than would be possible with reliance on a base station in that area for communication. In another example, multiple UEs associated with a single user (e.g., a work mobile phone, a personal mobile phone, and a 5G-enabled smart watch) may form peer-to-peer link(s) for sharing data associated with the single user. Doing so improves communication between the multiple UEs when the UEs are in a challenging wireless environment (e.g., a room in a building with substantial signal attenuation due to shielding, noise bursts, cinderblock walls, metal studs, tall neighbor buildings, mountains or other terrain, distance from a base station, and so forth).

In either of the examples above, a base station collects beamforming capability of each UE that will participate in a peer-to-peer mmWave link. The number of phased arrays and the number of transmitter and receiver beams supported for each of the phased arrays are examples of beamforming capability of each of the UEs that the base station collects. The base station uses the collected information to allocate air interface resources for each peer-to-peer mmWave link. The base station can use the beamforming capability of each of the multiple UEs to customize resource allocations made for each peer-to-peer mmWave link.

The base station determines a beam association procedure and communicates the beam association procedure to each of the UEs along with an authorization and grant of the air interface resources for the peer-to-peer communication. The UEs perform the beam association procedure to identify each other and establish a peer-to-peer mmWave link. The beam association procedure may define beam-sweeping patterns or beam-correspondence procedures specifically selected by the base station according to the beamforming capabilities of the UEs. The UEs receive the authorization and perform the beam association procedure to conduct peer-to-peer communications.

By using the beam-sweeping patterns and beam-correspondence procedures defined in the beam association procedure received from the base station, the UEs establish peer-to-peer mmWave links. After establishment, the UEs may communicate over the peer-to-peer mmWave link independent of links that the UEs otherwise maintain with the base station. As such, even if with signal interference or distance between a single UE and a base station, peer-to-peer communications can occur between the UEs, with improved link quality to provide higher data throughput rates, more efficient network resource utilization, and the like. Furthermore, reliance on the base station to help establish the peer-to-peer mmWave links may help the UEs mitigate interference from nearby mmWave links. In addition, by relying on the base station to specify the beam sweeping pattern, beam acquisition by the UEs may be improved.

In aspects, a method performed by a first UE to establish a peer-to-peer mmWave link with a second UE is disclosed. The method includes: receiving, by the first UE and from a base station of a wireless network, an indication of a grant of air interface resources for the first UE to communicate on the peer-to-peer mmWave link with the second UE; receiving, by the first UE and from the base station, a beam-sweeping procedure for selecting a beam for establishing the peer-to-peer mmWave link with the second UE; executing the beam-sweeping procedure to select the beam for establishing the peer-to-peer mmWave link with the second UE; and communicating with the second UE using the beam selected in response to executing the beam-sweeping procedure.

In other aspects, a method performed by a base station to establish a peer-to-peer mmWave link between a first and a second UE is disclosed. The method includes determining, by the base station, air interface resources for the first and the second UE to communicate using the peer-to-peer mmWave link; determining a beam-forming procedure for establishing the peer-to-peer mmWave link; and transmitting, to the first or the second UE, an indication of a grant of the air interface resources and the beam-forming procedure, the air interface resources and the beam-forming procedure by which communication is directed to be performed between the first and the second UE through the peer-to-peer mmWave link.

In additional aspects, a first UE is disclosed that includes a radio frequency (RF) transceiver coupled to a processor and memory system. The processor and memory system includes instructions that are executable to establish a peer-to-peer mmWave link with a second UE by: receiving, using the RF transceiver, and from a base station, an indication of a grant of air interface resources for the first UE to communicate on the peer-to-peer mmWave link with the second UE; receiving, using the RF transceiver, and from the base station, a beam-sweeping procedure to select a beam for establishing the peer-to-peer mmWave link with the second UE; executing the beam-sweeping procedure to select the beam for establishing the peer-to-peer mmWave link with the second UE; and communicating with the second UE using the beam selected in response to executing the beam-sweeping procedure.

In additional aspects, a base station is disclosed that includes a RF transceiver coupled to a processor and memory system. The processor and memory system include instructions that are executable to establish a peer-to-peer mmWave link between a first and a second UE. The instructions are executable to establish the peer-to-peer mmWave link by determining, by the base station, air interface resources for the first and the second UE to communicate using the peer-to-peer mmWave link; determining a beam-forming procedure for establishing the peer-to-peer mmWave link; and transmitting, to the first or the second UE, an indication of a grant of the air interface resources and the beam-forming procedure, the air interface resources and the beam-forming procedure by which communication is directed to be performed between the first and the second UE through the peer-to-peer mmWave link.

Example Environments

FIG. 1 illustrates an example operating environment in which aspects of UE-to-UE mmWave links can be implemented. FIG. 1 illustrates an example environment 100 which includes multiple user equipment 110 (UE 110) (illustrated as UE 111, UE 112, and UE 113) that can communicate with base stations 120 (illustrated as base stations 121 and 122) through wireless communication links 130 (wireless link 130), illustrated as wireless links 131 and 132. Each of the UE 110 may communicate with one of the other UE 110 through peer-to-peer mmWave wireless communication links (peer-to-peer mmWave links) 180, including peer-to-peer mmWave links 181, 182, and 183. For simplicity, the UE 110 is implemented as a smartphone but may be implemented as any suitable computing or electronic device, such as a smart watch, mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 collectively form a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2 AP) through an X2 interface, at 106, to exchange user-plane and control-plane data. The UE 110 may connect, via the core network 150, to public networks, such as the Internet 160 to interact with a remote service 170.

Each of the multiple UE 110 can communicate with one of the other UE 110 using the peer-to-peer mmWave links 180. The peer-to-peer mmWave link 181 transmits data between the UE 111 and the UE 112, the peer-to-peer mmWave link 182 transmits data between the UE 111 and the UE 113, and the peer-to-peer mmWave link 183 transmits data between the UE 113 and the UE 112. Each of the peer-to-peer mmWave links 180 is established between a different pair of the UE 110. The UE 111 and the UE 112 may establish the peer-to-peer mmWave link 181, the UE 111 and the UE 113 may establish the peer-to-peer mmWave link 182, and the UE 112 and the UE 113 may establish the peer-to-peer mmWave link 183.

The UEs 110 communicate with the base stations 120 using the wireless links 130 to request authorization, and obtain air interface resources and procedures, for establishing each of the peer-to-peer mmWave links 180. For example, the UE 111 and the UE 112 may send a request to the base stations 120 for authorization to establish and communicate directly on the peer-to-peer mmWave link 181. In response to the request, the UE 111 and the UE 112 may receive an authorization from the base stations 120 including a beam-sweeping procedure for establishing the peer-to-peer mmWave link 181. The UE 111 and the UE 112 each receive respective beam-sweeping procedures (e.g., beam-sweeping patterns and beam-correspondence procedures) from the base stations 120 for establishing the peer-to-peer mmWave link 181. The UE 111 and the UE 112 each execute the respective beam-sweeping procedures to establish the peer-to-peer mmWave link 181.

By performing the respective beam-sweeping procedures, the UE 111 and the UE 112 can establish the peer-to-peer mmWave link 181 to communicate. After establishment, the UE 111 and the UE 112 may communicate over the peer-to-peer mmWave link 181 apart from, or in addition to, the wireless links 130 that the UEs 111 and 112 may otherwise share with the base stations 120. As such, even if with signal interference or distance between the UEs 110 and the base stations 120, the UEs 110 can implement peer-to-peer communication with better link quality and as a result, higher data rates, and improved communication reliability, thereby freeing resources of the UEs 110 and air interface resources of the RAN 140, of which the base stations 120 can more-efficiently allocate to other communications.

Example Devices

Figure 2:
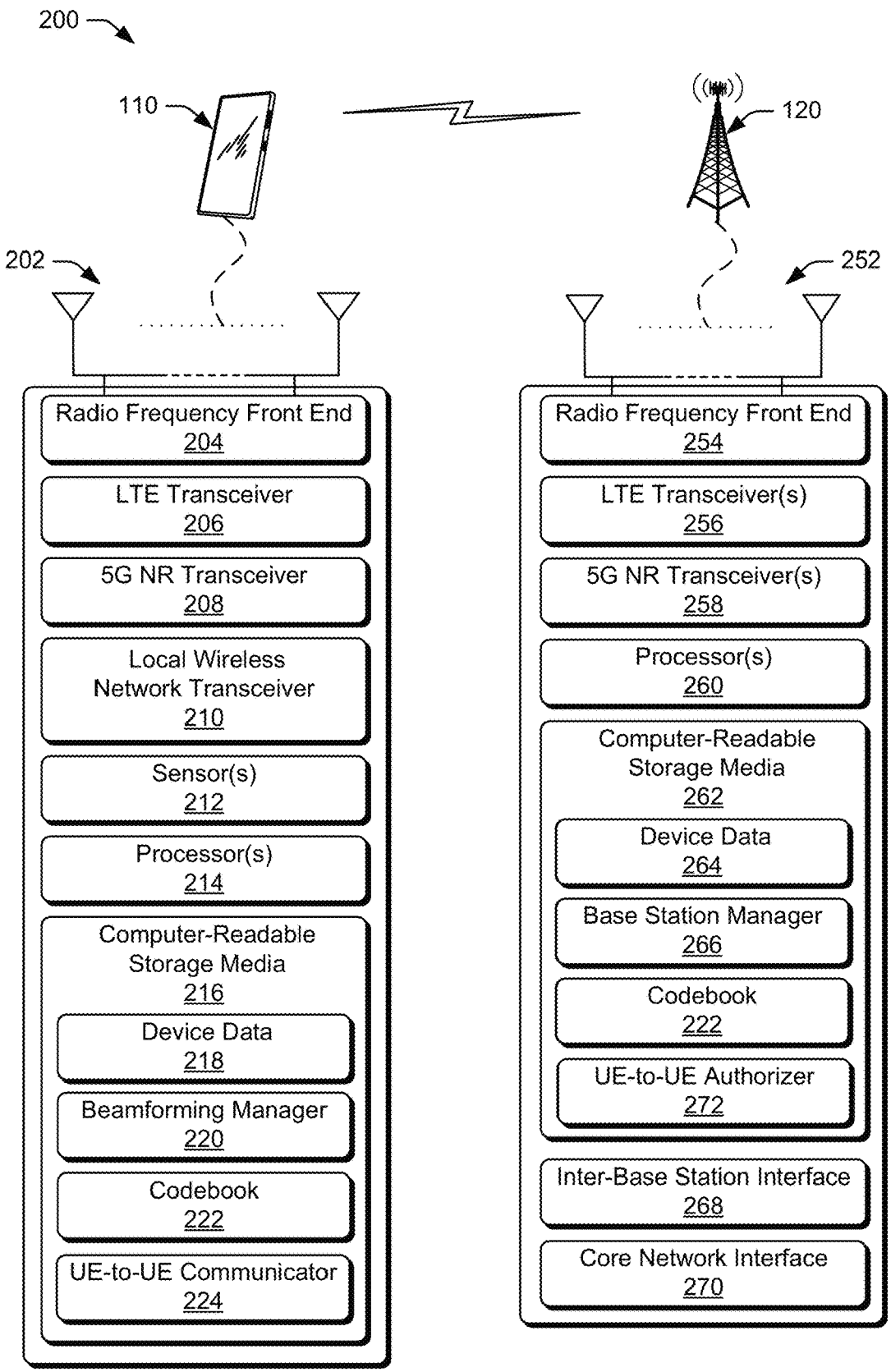
FIG. 2 illustrates an example device diagram that can implement various aspects of establishing peer-to-peer mmWave links.

FIG. 2 illustrates an example device diagram 200 of the UE 110 and the base stations 120. FIG. 2 shows the multiple UEs 110 and the base stations 120. The device diagram 200 illustrates the base stations 120 as being configured to authorize and grant resources for the UE 110 to establish mmWave links amongst each other, in a wireless communications network. The user equipment 110 is configured to establish the mmWave links in response to receiving authorizations for the mmWave links, from the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., wireless local area network (WLAN), Bluetooth™, sonar, radar, lidar, Near Field Communication (NFC), a wireless personal area network (WPAN), Wi-Fi-Direct, IEEE 802.15.4, ZigBee, Thread, mmWave) amongst the UE 110. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 that can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory usable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a beamforming manager 220. Alternately or additionally, the beamforming manager 220 may be implemented in whole or part as hardware logic or circuitry integrated with or separate from other components of the UE 110. In at least some aspects, the beamforming manager 220 configures the RF front end 204, the LTE transceiver 206, the 5G NR transceiver 208, and/or the local wireless network transceiver 210 to implement the techniques described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band(s) defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory usable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and/or entities.

In aspects, the user equipment 102 provides feedback to the base stations 120 for beamforming of the 5G NR downlink. For example, beamforming for Massive MIMO uses closed-loop or beam-index beamforming for the 5G NR downlink. The base stations 120 and the UE 102 both have a copy of the codebook 222 that includes precoding matrices for beamforming with an index value (e.g., a precoding matrix indicator or PMI) associated with each precoding matrix. The codebook 222 can be stored in the CRM 216 of the user equipment 102 and in the CRM 262 of the base stations 120.

Upon authorization from the base stations 120, the UE 110 are configured to establish peer-to-peer mmWave links for performing peer-to-peer communication. The CRM 262 includes a UE-to-UE authorizer 272 that authorizes two or more of the UEs 110 to communicate directly using peer-to-peer mmWave links defined by the UE-to-UE authorizer 272. The UE-to-UE authorizer 272 determines a procedure for establishing the peer-to-peer mmWave links, grants air interface resources for the peer-to-peer mmWave links and transmits the procedure and resource grant to the UEs 110.

The CRM 216 includes a UE-to-UE communicator 224 that receives a beam-sweeping procedure to execute for establishing a peer-to-peer mmWave link with another one of the UE 110. In conjunction with receiving an authorization, the UE-to-UE communicator 224 receives the beam-sweeping procedure provided by the UE-to-UE authorizer 272. The UE-to-UE communicator 224 coordinates with and directs the beamforming manager 220 to execute the beam-sweeping procedure. The beamforming manager 220 of one of the UEs 110 executes the beam-sweeping procedure while the beamforming manager 220 of another one of the UEs 110 executes the beam-sweeping procedure to establish a peer-to-peer mmWave link between the two UEs 110.

Example Implementations

Figure 3:
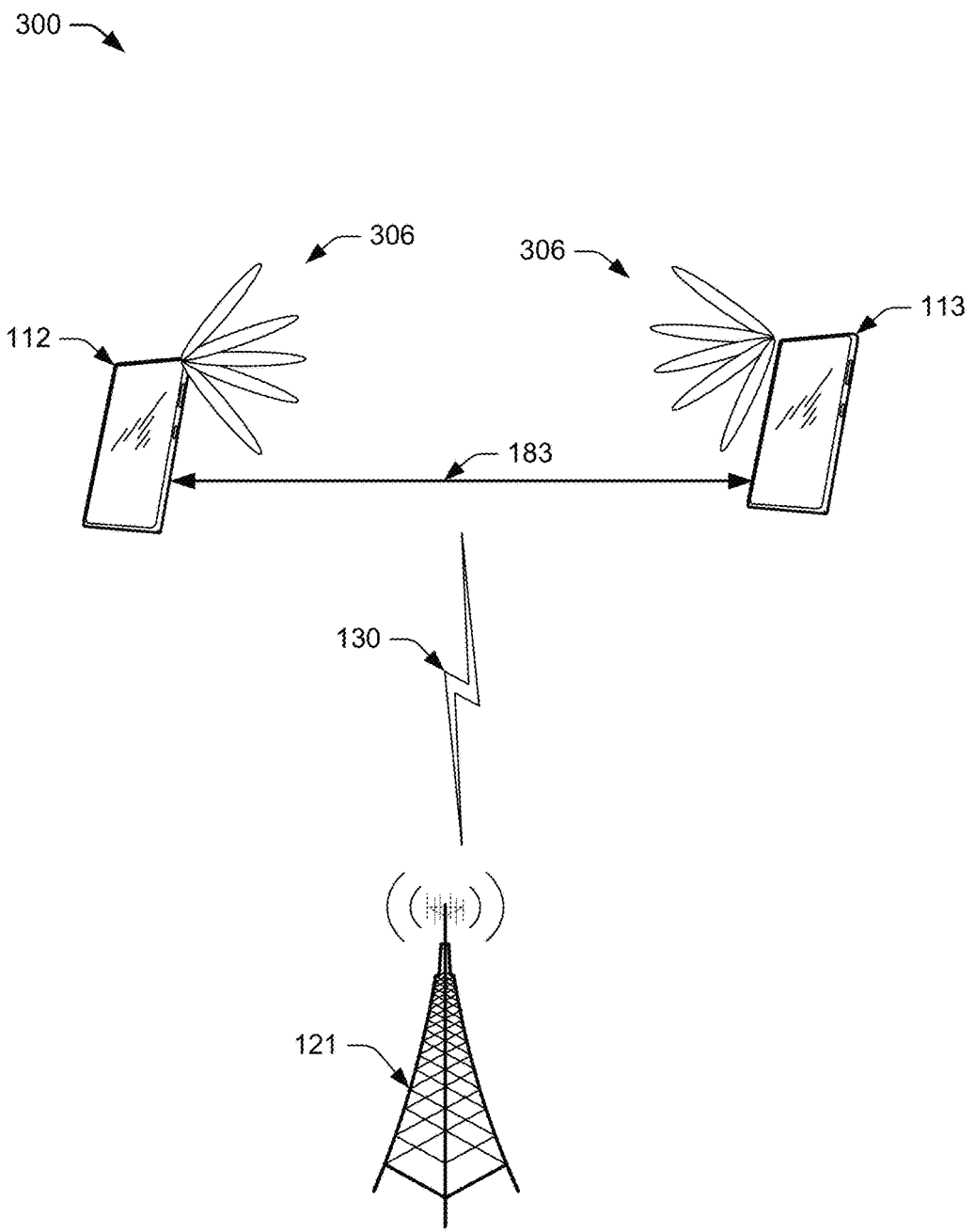
FIG. 3 illustrates an example implementation of establishing peer-to-peer mmWave links.

FIG. 3 illustrates an example implementation of peer-to-peer mmWave links. FIG. 3 shows a communication system 300 including the UE 112 in direct communication with the UE 113 over the peer-to-peer mmWave link 183. In the example of FIG. 3, the peer-to-peer mmWave link 183 is a mmWave link established by the UE 112 and the UE 113, in accordance with the described techniques.

The base station 121 is configured to authorize the peer-to-peer mmWave link 183 and grant air interface resources for the UEs 112 and 113 to establish the peer-to-peer mmWave link 183. The UEs 112 and 113 each communicate with the base station 121 over wireless links 130. The UEs 112 and 113 communicate using the peer-to-peer mmWave link 183, which is formed by the UE-beams 306.

The base station 121 determines beam-forming capability information of the UEs 112 and 113. The base station 121 may determine the beam-forming capability information from UE capability information the base station 121 receives from the UEs 112 and 113. The base station 121 uses the beam-forming capability of the UEs 112 and 113 to enable communication with the UEs 112 and 113, over the wireless links 130, as well as to enable communication between the UEs 112 and 113 over the peer-to-peer mmWave link 183. Based on the beamforming capability of the UEs 112 and 113, the base station 121 can allocate specific air interface resources to the peer-to-peer mmWave link 183 and define a procedure that the UEs can use to determine the specific beams.

The beam-forming capability information of the UEs 112 and 113 can include any information to determine the specific UE-beams 306. A quantity of phased arrays of each of the UEs 112 and 113 is an example of beam-forming capability. An additional example of beam-forming capability includes a quantity of transmitter beams or a quantity of receiver beams supported by each phased array of each of the UEs 112 and 113. Using the beam-forming capability information collected about the UEs 112 and 113, the base station 121 determines a beam-sweeping procedure for the UEs 112 and 113 to establish the wireless link 183.

The base station 121 may collect beam-forming capability information of the UEs 112 and 113, as part of authorizing, or in advance of granting air interface resources to the UEs 112 and 113 to communicate using the peer-to-peer mmWave link 183. The base station 121 transmits an authorization defining air interface resources granted to the UEs 112 and 113 for establishing and communicating on the peer-to-peer mmWave link 183. In response to receiving the authorization for the peer-to-peer mmWave link 183, the UEs 112 and 113 determine the UE-beams 306 and the beam-forming procedures that the UEs 112 and 113 later execute to establish communication over the peer-to-peer mmWave link 183.

The authorization for establishing the peer-to-peer mmWave link 183 between the UEs 112 and 113 may specify one or more characteristics of the UE-beams 306 to establish peer-to-peer communication. The authorization may include information, such as a mmWave band or frequency, a narrow-band allocation, a mmWave numerology including a sub-carrier spacing, a transmit power, a transmit duty cycle, a transmit and receive slot allocation, time durations, respective geographic locations of the UEs, or other information that UEs 112 and 113 may need to identify each other and communicate.

The authorization for establishing the peer-to-peer mmWave link 183 between the UEs 112 and 113 may indicate a beam-correspondence procedure that the UEs 112 and 113 ultimately use to communicate over the peer-to-peer mmWave link 183. The beam-correspondence procedure defines when and/or how the UEs 112 and 113 are to communicate over the mmWave link 183, as opposed to just indicating how to identify the other UE and/or establish the mmWave link 183.

The beam-correspondence procedure defines when a UE conducts transmissions, using transmitter beams, at times when each of the transmitter beams corresponds to a reception beam used by another UE to receive the corresponding transmissions. Each transmission by the UE on a mmWave link, such as the mmWave link 183, whether or not part of a burst, is carried on a transmission beam that is concurrently assigned as a reception beam for the other UE that is also communicating on the mmWave link. For example, the authorization for establishing the peer-to-peer mmWave link 183 between the UEs 112 and 113 may direct the UE 112 to perform a burst transmission using a particular set of transmission beams, followed by a burst reception using a particular set of reception beams. For the UE 113, the authorization may direct the UE 113 to perform a burst reception using the particular set of transmission beams instead, as reception beams, followed by a burst transmission using the particular set of reception beams, instead, as transmission beams.

In some examples, each of the UEs 112 and 113 use identical beams for reception or transmission. For example, the authorization for establishing the peer-to-peer mmWave link 183 between the UEs 112 and 113 may specify the UE 112 perform a transmission, or burst transmission, using one or more transmission beams, followed by a reception, or burst reception, using the same or different beams as reception beams. The authorization specifies the UE 113 execute a complementary correspondence procedure to that executed by the UE 112. By executing complimentary transmissions and receptions (or burst transmissions and burst receptions), the UEs 112 and 113 are configured to perform peer-to-peer communication using a peer-to-peer mmWave link established between the UEs 112 and 113. This communication can be independent from the wireless links 130 that the UEs 112 and 113 maintain with the base stations 120.

The authorization for establishing the peer-to-peer mmWave link 183 between the UEs 112 and 113 may define a particular time slot when each of the UEs 112 and 113 is to use identical beams for both reception and transmission, including bursts. For example, for implementing regular (not burst) communications, an identical beam for each reception and transmission pair is used. For implementing burst communications, an identical beam for each reception and transmission pair within a burst is used.

Example Procedures

Figure 4:
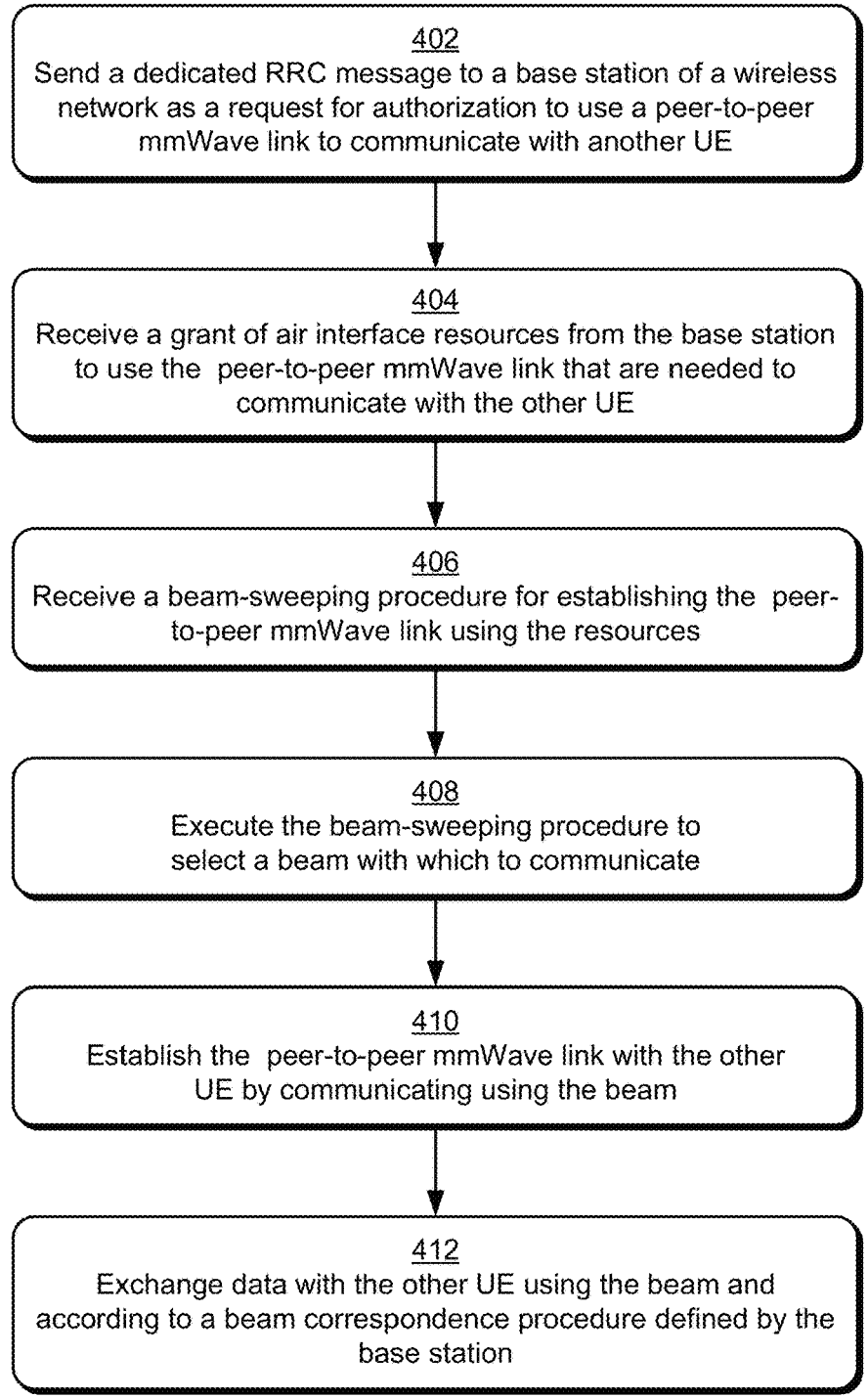
FIG. 4 illustrates an example process of a UE establishing a peer-to-peer mmWave link with another UE.

FIG. 4 illustrates operations 400 executed by a UE for establishing peer-to-peer mmWave links with another UE. The UE establishing the peer-to-peer mmWave link may be the UE 112, as previously described. When the UE 112 executes the operations 400, the UE 112 may establish the peer-to-peer mmWave link 183 with the UE 113.

At 402, the UE 112 requests authorization from a base station of a wireless network to use a peer-to-peer mmWave link to communicate with another UE on the wireless network. For example, the UE 112 may send a dedicated radio resource control (RRC) message to the base station 121 requesting authorization to create a peer-to-peer mmWave link with the UE 113.

At 404, the UE 112 receives a grant of air interface resources from the base station for the mmWave link with the other UE. For example, the UE 112 may interpret a dedicated RRC message or a broadcast message transmitted by the base station 121 as defining a beam-sweeping procedure, including parameters or characteristics of a peer-to-peer mmWave link that the UEs 112 and 113 are capable of (and authorized) to establish. In some examples, the RRC message or broadcast message may specify a beam-sweeping pattern and/or a beam-correspondence procedure for establishing, or communicating on, the mmWave link.

As part of 404 or separate from 404, at 406, the UE 112 receives a beam-sweeping procedure chosen by the base station 121 for establishing the peer-to-peer mmWave link 183 with the other UE 113. For example, the grant of air interface resources received from the base station 121 may include data indicating the particular beam-sweeping procedure. As another example, the base station 121 may send the beam-sweeping procedure prior to, or subsequent from, sending the grant of air interface resources. The beam-sweeping procedure may specify a particular data to exchange with the other UE 113 using a particular beam-sweeping pattern. A beam-sweeping pattern may define a duration of each beam, a quantity of beams, and a periodicity of beam-sweeping.

At 408, the UE 112 executes the beam-sweeping procedure to select a beam with which to communicate. For example, the UEs 112 and 113 may each execute the beam-sweeping procedure (e.g., by exchanging data with the other UE using a duration of each beam, a quantity of beams, and a periodicity of beam-sweeping defined by a beam-sweeping pattern) defined by respective resource grants obtained from the base station 121. The result of the beam-sweeping procedures is a beam selected by the UEs 112 and 113 to implement the peer-to-peer mmWave link and resulting communication.

At 410, the UE 112 establishes the peer-to-peer mmWave link 183 with the other UE 113 by communicating with the other UE 113 using the selected beam.

At 412, the UE 112 exchanges data with the other UE 113 using a beam-correspondence procedure. For example, as derived from the resource grant received from the base station 121 or received in a separate communication from the base station 121, the UE 112 may communicate with the other UE 113 using a first beam-correspondence procedure for transmission on the mmWave link 183 and a second beam-correspondence procedure for reception on the mmWave link 183. The UE 112 may exchange data with the other UE 112 using the beam-correspondence procedure by receiving a first portion of data from the other UE 113 using the second beam-correspondence procedure and transmitting a second portion of the data to the other UE 113 using the first beam-correspondence procedure. The UE 112 may in some cases gain efficiencies by using a common beam and beam-correspondence procedure for transmissions and receptions. In such a case, the UE 112 transmits data to the other UE 113 using air interface resources previously used by the UE 112 to receive the first portion of the data from the other UE 113.

Figure 5:
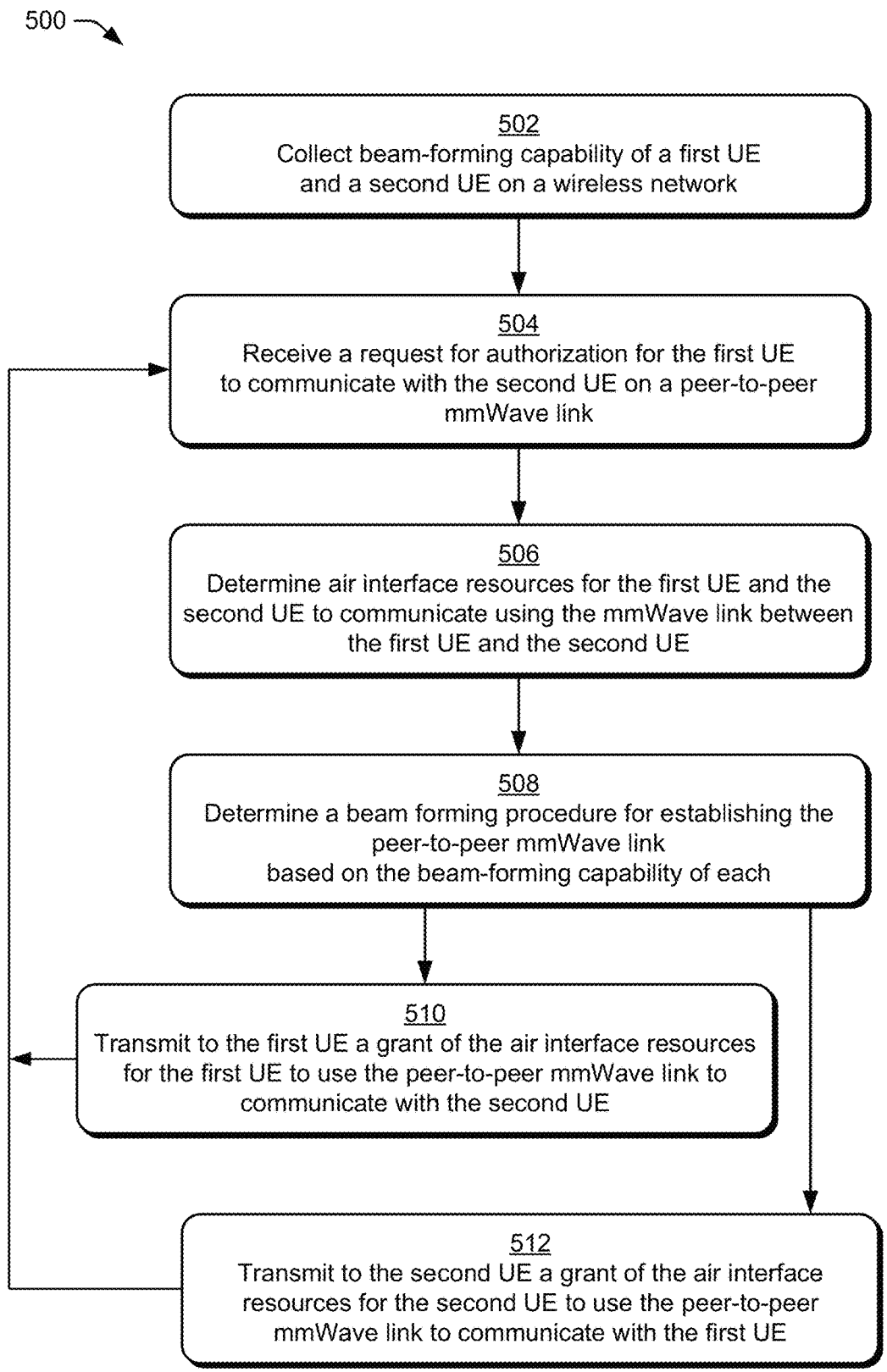
FIG. 5 illustrates an example process of a base station enabling a UE to establish a peer-to-peer mmWave link with another UE.

FIG. 5 illustrates operations 500 executed by a base station for enabling a UE to establish a peer-to-peer mmWave link with another UE. This base station may be one or more of the base stations 120, for example, the base station 121, as previously described. At 502, the base station 121 receives beam-forming capability information of the UEs 110, including the UEs 112 and 113. For example, the beamforming capability information is included in parameters of the UE capabilities received from the UEs 110. For example, the UEs 112 and 113 can send or update beam-forming capability maintained by the base station 121 using a layer 3 network interface and procedure. The base station 121 can further obtain beamforming capability inserted by the UEs 112 and 113 into MAC (Medium Access Control) elements.

At 504, the base station 121 receives a request from the UEs 112 and 113, for authorization to communicate on a peer-to-peer mmWave link. In some examples, the base station 121 receives a request from one of the UEs 112 and 113 that identifies the other one of the UEs 112 and 113. In other examples, each of the UEs 112 and 113 send requests identifying the other. The base station 121 determines the state of the UEs 110 communicating with the base station 121 and identifies, based on the beam-forming capability information, the peer-to-peer mmWave link that the UEs 112 and 113 could be allowed to communicate on, as the wireless link 183. For example, the beam-forming capability information of the UEs 112 and 113 may include a quantity of phased arrays of each of the UEs 112 and 113. The beam-forming capability information may additionally or alternatively include a quantity of transmitter beams and receiver beams supported by each phased array of each of the UEs 112 and 113. The base station 121 determines a procedure for the UEs 112 and 113 to establish beamformed communication over the peer-to-peer mmWave link, given the respective capabilities of each.

At 506, the base station 121 determines air interface resources for the UEs 112 and 113 to communicate using a peer-to-peer mmWave link between the UEs 112 and 113. At 508, the base station 121 determines a beamforming procedure for the UEs 112 and 113 for establishing the peer-to-peer mmWave link.

The base station 121 may indicate to each of the UEs 112 and 113 authorization of at least one of: a mmWave band or frequency on which to communicate, a narrow-band allocation to communicate, a mmWave numerology including a sub-carrier spacing for which to communicate, a transmit power for which to communicate, a transmit duty cycle for which to communicate, a transmit and receive slot allocation for which to communicate, particular durations of time at which to communicate, or particular geographic locations from which each of the UEs communicates.

The base station 121 may provide the UEs 112 and 113 with an indication of a beam-correspondence procedure. For example, the base station 121 may send dedicated RRC messages to each of the UEs 112 and 113 specifying the beam-correspondence procedure to use. In other cases, the base station 121 sends a broadcast message received by the UEs 112 and 113 with instructions for the beam-correspondence procedure.

The beam-correspondence procedure, as one example, defines a burst transmission using a particular set of transmission beams, followed by a burst reception using a particular set of reception beams. The beam-correspondence procedure defines a burst reception using the particular set of transmission beams used in the burst transmission, followed by a burst transmission using the particular set of reception beams used in the burst reception. In cases when the particular set of transmission beams and the particular set of reception beams are an identical set of beams, each burst transmission is defined by a quantity of beams and a duration of each transmission within the burst transmission. As for the burst reception, when the particular set of transmission beams and the particular set of reception beams are an identical set of beams, each burst reception is defined by the quantity of beams and a duration of each reception within the burst reception.

At step 510, the base station 121 transmits to the first UE (UE 112) a grant of air interface resources to use the peer-to-peer mmWave link to communicate with the second UE (UE 113) on the wireless network. At step 512 the base station 121 transmits to the second UE (UE 113) a grant of air interface resources to use the peer-to-peer mmWave link to communicate with the first UE (UE 112) on the wireless network.

The UEs 112 and 113 establish the peer-to-peer mmWave link according to the grant of air interface resources each receives from the base station 121. The UEs 112 and 113 communicate using the peer-to-peer mmWave link until the communication ceases, or until the base station 121 revokes the resource grant. At a later time, the UEs 112 and 113 may request a new grant for air interface resources to communicate using peer-to-peer mmWave link, at which time the base station 121 repeats 504-512.

In some situations, the peer-to-peer mmWave link may degrade mid-communication session. The base station 121 may specify a peer-to-peer recovery procedure that the UEs 112 and 113 are to initiate in response to degradation. For example, with the UEs 112 and 113 already granted air interface resources for beam-sweeping, the UEs 112 and 113 can execute the beam-sweeping procedure to select a new beam with which to communicate. If a subsequent beam-sweeping procedure fails to identify a new beam for communication between the UEs 112 and 113, the UEs 112 and 113 can again request for more air interface resources from the base station 121, and repeat steps 504-512.

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

CONCLUSION

The foregoing description has described methods and apparatuses are described for enabling a base station to enable peer-to-peer communication among multiple user equipment over a mmWave link. The techniques described herein overcome challenges that the multiple UEs might otherwise face in trying to establish peer-to-peer links on their own. By relying on the base station to grant air interface resources for the UE to perform peer-to-peer communications with the UE, the UE can communicate directly with the other UE, independent of links that the UE or the other UE maintains with the base station. Furthermore, reliance on the base station may help the UE and the other UE mitigate interference from other nearby mmWave links that are separate from the peer-to-peer mmWave link. In addition, by relying on the base station to specify the beam sweeping pattern, beam acquisition by the UE and the other UE may be improved.

Although techniques and devices for establishing peer-to-peer mmWave links for peer-to-peer communication with other UEs have been described in language specific to features and/or methods, it is to be understood that the subject of the appended claims is not necessarily limited to the specific features or methods described. Rather, the specific features and methods are disclosed as example implementations for establishing peer-to-peer mmWave links for peer-to-peer communication among UEs.

Clause 1. A method performed by a first user equipment (UE) to establish a peer-to-peer mmWave link with a second UE, the method including: receiving, by the first UE and from a base station of a wireless network, an indication of a grant of air interface air interface resources for the first UE to communicate on the peer-to-peer mmWave link with the second UE; receiving, by the first UE and from the base station, a beam-sweeping procedure for selecting a beam for establishing the peer-to-peer mmWave link with the second UE; executing the beam-sweeping procedure to select the beam for establishing the peer-to-peer mmWave link with the second UE; and communicating with the second UE using the beam selected in response to executing the beam-sweeping procedure.

Clause 2. The method of clause 1, wherein the beam-sweeping procedure includes a beam-sweeping pattern, and wherein executing the beam-sweeping procedure comprises executing the beam-sweeping procedure using the beam-sweeping pattern included in the beam-sweeping procedure.

Clause 3. The method of clause 2, wherein: the beam-sweeping pattern includes a first beam-sweeping pattern for transmission and a second beam-sweeping pattern for reception, and executing the beam-sweeping procedure to select the beam for establishing the peer-to-peer mmWave link with the second UE comprises using the beam-sweeping pattern for transmission or the beam-sweeping pattern for reception to select the beam for establishing the peer-to-peer mmWave link with the second UE.

Clause 4. The method of clause 2 or clause 3, wherein the beam-sweeping pattern includes a duration of each beam, a quantity of beams, and a periodicity of beam-sweeping.

Clause 5. The method of any of clauses 1-4, wherein: the beam-sweeping procedure includes a beam correspondence procedure, and communicating with the second UE using the beam selected comprises communicating with the second UE using the beam-correspondence procedure.

Clause 6. The method of clause 5, wherein: the beam-correspondence procedure includes a first correspondence procedure for transmission and a second correspondence procedure for reception and communicating with the second UE using the beam-correspondence procedure comprises communicating with the second UE using the first correspondence procedure or the second correspondence procedure.

Clause 7. The method of clause 6, further comprising: after communicating with the second UE using the first correspondence procedure, communicating with the second UE using the second correspondence procedure, wherein communicating with the second UE using the second correspondence procedure comprises using one or more of the air interface resources that were used for communicating with the second UE using the first correspondence procedure.

Clause 8. The method of any of clauses 1-7, wherein receiving the indication of the grant of air interface resources for the first UE to communicate on the peer-to-peer mmWave link with the second UE comprises receiving the indication of the grant of air interface resources as a dedicated RRC message or a broadcast message from the base station.

Clause 9. The method of any of clauses 1-8, wherein receiving the indication of the grant of air interface resources comprises receiving the indication of the grant of air interface resources in response to requesting, from the base station, the grant of air interface resources.

Clause 10. A method performed by a base station to establish a peer-to-peer mmWave link between a first and a second user equipment (UE), the method comprising: determining, by the base station, air interface resources for the first and the second UE to communicate using the peer-to-peer mmWave link; determining a beam-forming procedure for establishing the peer-to-peer mmWave link; and transmitting, to the first or the second UE, an indication of a grant of the air interface resources and the beam-forming procedure, the air interface resources and the beam-forming procedure by which communication is directed to be performed between the first and the second UE through the peer-to-peer mmWave link.

Clause 11. The method of clause 10, further comprising: determining that the first and the second UE are capable of communicating on the peer-to-peer mmWave link prior to determining the beam-forming procedure for establishing the peer-to-peer mmWave link.

Clause 12. The method of clause 10 or clause 11, further comprising: receiving beam-forming capability information of the first and the second UE; and determining, based on the beam-forming capability information, the beam-forming procedure for establishing the peer-to-peer mmWave link.

Clause 13. The method of clause 12, wherein the beam-forming capability information of the first and the second UE comprises a respective quantity of phased arrays of each of the first and the second UE.

Clause 14. The method of clause 12 or clause 13, wherein the beam-forming capability information of the first and the second UE comprises a respective quantity of transmitter beams and receiver beams supported by each phased array of each of the first and the second UE.

Clause 15. The method of any of clauses 10-14, wherein the beam-forming procedure includes at least one of: a mmWave frequency band or frequency, a narrow band allocation, a mmWave numerology including a sub-carrier spacing, a transmit power, a transmit duty cycle, a transmit and receive slot allocation, one or more particular durations of time, or one or more geographic locations from where the first or the second UE are communicating.

Clause 16. The method of any of clauses 10-15, wherein the beam-forming procedure includes a beam-correspondence procedure indicating that the first UE perform a burst transmission using a particular set of transmitter beams followed by a burst reception using a particular set of receiver beams.

Clause 17. The method of clause 16, wherein the particular set of transmitter beams and the particular set of receiver beams are an identical set of beams, the burst transmission is defined by a quantity of beams and a duration of each transmission within the burst transmission, and the burst reception is defined by the quantity of beams and a duration of each reception within the burst reception.

Clause 18. The method of any of clauses 10-17, wherein determining the air interface resources for the first and the second UE to communicate using the peer-to-peer mmWave link is in response to receiving, from the first or the second UE, a request for a grant of the air interface resources.

Clause 19. A first user equipment (UE) comprising: a radio frequency (RF) transceiver; and a processor and memory system coupled to the RF transceiver and comprising instructions that are executable to establish a peer-to-peer mmWave link with a second UE by: receiving, using the RF transceiver, and from a base station, an indication of a grant of air interface resources for the first UE to communicate on the peer-to-peer mmWave link with the second UE; receiving, using the RF transceiver, and from the base station, a beam-sweeping procedure to select a beam for establishing the peer-to-peer mmWave link with the second UE; executing the beam-sweeping procedure to select the beam for establishing the peer-to-peer mmWave link with the second UE; and communicating with the second UE using the beam selected in response to executing the beam-sweeping procedure.

Clause 20. The first user equipment of clause 19, wherein: the beam-sweeping procedure includes a beam-correspondence procedure determined by the base station;

and the instructions are executable to establish the peer-to-peer mmWave link with the second UE by using the beam selected during the beam-sweeping procedure and by using the beam-correspondence procedure determined by the base station.

Clause 21. A system comprising means for performing any of the methods of clauses 1-18.

What is claimed is:

1. A method performed by a first user equipment to establish a peer-to-peer millimeter wave link with a second user equipment, the method comprising:
    receiving, by the first user equipment and from a base station of a wireless network, an indication of a grant of air interface resources for the first user equipment to communicate on the peer-to-peer millimeter wave link with the second user equipment;
    receiving, by the first user equipment and from the base station, instructions to perform a beam-sweeping procedure to select a beam for establishing and to communicate on the peer-to-peer millimeter wave link with the second user equipment, the instructions including a beam correspondence procedure with a first correspondence procedure for transmission from the first user equipment to the second user equipment and a second correspondence procedure for reception by the first user equipment from the second user equipment;
    executing the beam-sweeping procedure to select the beam for establishing the peer-to-peer millimeter wave link with the second user equipment; and
    communicating data with the second user equipment using the first correspondence procedure or the second correspondence procedure and the beam selected in response to executing the beam-sweeping procedure.

2. The method of claim 1, wherein:
    the instructions include a beam-sweeping pattern, the beam-sweeping pattern comprising at least one of a quantity of beams, a duration of each beam, and a periodicity of beam-sweeping; and
    executing the beam-sweeping procedure comprises executing the beam-sweeping procedure using the beam-sweeping pattern included in the instructions.

3. The method of claim 2, wherein:
    the beam-sweeping pattern includes a first beam-sweeping pattern for transmission and a second beam-sweeping pattern for reception, and
    executing the beam-sweeping procedure to select the beam for establishing the peer-to-peer millimeter wave link with the second user equipment comprises using the first beam-sweeping pattern for transmission or the second beam-sweeping pattern for reception to select the beam for establishing the peer-to-peer millimeter wave link with the second user equipment.

4. The method of claim 1, further comprising:
    after communicating with the second user equipment using the first correspondence procedure, communicating with the second user equipment using the second correspondence procedure, wherein communicating with the second user equipment using the second correspondence procedure comprises using one or more of the air interface resources that were used for communicating with the second user equipment using the first correspondence procedure.

5. The method of claim 1, wherein receiving the indication of the grant of air interface resources for the first user equipment to communicate on the peer-to-peer millimeter wave link with the second user equipment comprises receiving the indication of the grant of air interface resources as a dedicated radio resource control message or a broadcast message from the base station.

6. The method of claim 1, further comprising:
    transmitting, by the first user equipment to the base station, prior to the receiving of the instructions, beam-forming capability information of the first user equipment.

7. The method of claim 6, wherein the beam-forming capability information indicates at least one of: a quantity of phased arrays or a quantity of transmitter beams and receiver beams supported by the first user equipment.

8. A method performed by a base station to establish a peer-to-peer millimeter wave link between a first user equipment and a second user equipment, the method comprising:
    determining, by the base station, air interface resources for the first user equipment and the second user equipment to communicate using the peer-to-peer millimeter wave link;
    determining a beam-forming procedure for establishing the peer-to-peer millimeter wave link between the first user equipment and the second user equipment; and
    transmitting, to the first user equipment or the second user equipment, a first indication of a grant of the air interface resources and instructions to perform the beam-forming procedure, the instructions including a beam-correspondence procedure, the beam-correspondence procedure comprising a burst transmission using a particular set of transmitter beams and a burst reception using a particular set of receiver beams.

9. The method of claim 8, further comprising:
    transmitting, to the first user equipment or the second user equipment, as a single message, the first indication of the grant of the air interface resources and the instructions to perform the beam-forming procedure; or
    transmitting, to the first user equipment or the second user equipment, two separate messages including a first message with the first indication of the grant of the air interface resources and a second message with the instructions to perform the beam-forming procedure.

10. The method of claim 8, further comprising:
    receiving beam-forming capability information of the first user equipment and the second user equipment, the beam-forming capability information comprising at least one of a respective quantity of phased arrays of each of the first user equipment and the second user equipment or a respective quantity of transmitter beams and receiver beams supported by each phased array of each of the first and the second user equipment; and
    determining, based on the beam-forming capability information, the beam-forming procedure for establishing the peer-to-peer millimeter wave link.

11. The method of claim 8, wherein the instructions include at least one of:
    a millimeter wave frequency band or frequency,
    a narrow band allocation,
    a millimeter wave numerology including a sub-carrier spacing,
    a transmit power,
    a transmit duty cycle,
    a transmit and receive slot allocation,
    one or more particular durations of time, or
    one or more geographic locations from where the first or the second user equipment are communicating.

12. The method of claim 8, wherein the particular set of transmitter beams and the particular set of receiver beams are an identical set of beams, the burst transmission is defined by a quantity of beams and a duration of each transmission within the burst transmission, and the burst reception is defined by the quantity of beams and a duration of each reception within the burst reception.

13. The method of claim 8, wherein determining the air interface resources for the first user equipment and the second user equipment to communicate using the peer-to-peer millimeter wave link is in response to receiving, from the first or the second user equipment, a request for a grant of the air interface resources.

14. A user equipment comprising:
   a radio frequency (RF) transceiver; and
   a processor and memory system coupled to the RF transceiver and comprising instructions that are executable to:
      receive, from a base station of a wireless network, an indication of a grant of air interface resources for the user equipment to communicate on a peer-to-peer millimeter wave link with another user equipment;
      receive, from the base station, beam-sweeping instructions to perform a beam-sweeping procedure to select a beam for establishing and communicating on the peer-to-peer millimeter wave link with the other user equipment, the instructions including a beam correspondence procedure with a first correspondence procedure for transmission from the first user equipment to the second user equipment and a second correspondence procedure for reception by the first user equipment from the second user equipment;
      execute the beam-sweeping procedure to select the beam for establishing a peer-to-peer millimeter wave link with the other user equipment; and
      communicate data with the other user equipment using the first correspondence procedure or the second correspondence procedure and the beam selected in response to executing the beam-sweeping procedure.

15. The user equipment of claim 14, wherein:
   the beam-sweeping instructions include a beam-sweeping pattern, the beam-sweeping pattern comprising at least one of a quantity of beams, a duration of each beam, and a periodicity of beam-sweeping; and
   executing the beam-sweeping procedure comprises executing the beam-sweeping procedure using the beam-sweeping pattern included in the beam-sweeping instructions.

16. The user equipment of claim 15, wherein:
   the beam-sweeping pattern includes a first beam-sweeping pattern for transmission and a second beam-sweeping pattern for reception, and
   executing the beam-sweeping procedure to select the beam for establishing the peer-to-peer millimeter wave link with the other user equipment comprises using the first beam-sweeping pattern for transmission or the second beam-sweeping pattern for reception to select the beam for establishing the peer-to-peer millimeter wave link with the other user equipment.

17. The user equipment of claim 14, wherein the instructions are further executable by the processor and memory system to:
   after communicating with the other user equipment using the first correspondence procedure, communicate with the other user equipment using the second correspondence procedure, wherein the communication with the other user equipment using the second correspondence procedure comprises using one or more of the air interface resources that were used for communicating with the other user equipment using the first correspondence procedure.

* * * * *